United States Patent [19]

Broadbent et al.

[11] 3,890,435

[45] June 17, 1975

[54] ANTIBIOTIC SUBSTANCE

[75] Inventors: Douglas Broadbent, Alderley Edge; Brian Frederick Burrows, Wilmslow; Stephen Barnaby Carter, Kettleshulme; Harold George Hemming, Northenden, all of England

[73] Assignee: Imperial Chemical Industries Limited, London, England

[22] Filed: Apr. 7, 1971

[21] Appl. No.: 132,181

[52] U.S. Cl................................... 424/115; 195/81
[51] Int. Cl............................................ A61k 21/00
[58] Field of Search....................... 424/115; 195/81

[56] References Cited

UNITED STATES PATENTS 3,457,274  7/1969  Norris et al.......................... 260/325
3,464,891  9/1969  Norris et al........................... 195/81

Primary Examiner—Jerome D. Goldberg
Attorney, Agent, or Firm—Cushman, Darby & Cushman

[57] ABSTRACT

The new compound known as cytochalasin E and a process for its manufacture by cultivation of the organism *Rosellinia Necatrix*. The compound produces effects on tissue culture cells and is useful in the study of cytological processes.

2 Claims, No Drawings

ANTIBIOTIC SUBSTANCE

This invention relates to a new antibiotic product which produces effects on tissue culture cells similar to those produced by cytochalasins A, B, C and D, described by Carter in Nature, 1967, 213, 261 to 264.

According to the invention there is provided a new antibiotic product hereinafter described as cytochalasin E, which is identifiable by the following characteristics:- melting point: variable between 200° and 220°C., but commonly 206°-209°C.

infra-red spectrum: bands having $\nu$ max (in liquid paraffin) at 3520, 3450, 3200, 3120 (all weak), 1760, 1730, 1705 (all strong), 1670, 1640, (both weak) cm.$^{-1}$ ultraviolet spectrum: no selective absorption between 225 m$\mu$. and 350 m$\mu$.

proton magnetic resonance spectrum: peaks in the region of $\tau = 2.8$ (aromatic protons) when measured in CDCl$_3$ or C$_5$D$_5$N;

peaks (doublets) centred (when measured in C$_5$D$_5$N) at $\tau = 3.16$ and $\tau 4.10$ respectively, both having a coupling constant of 12.0 cycles per second, mass spectrometry: heaviest ion observed:

m/e = 495, corresponding to C$_{28}$H$_{33}$NO$_7$. other ions:- m/e = 337, corresponding to C$_{22}$H$_{27}$NO$_2$ m/e = 246, corresponding to C$_{15}$H$_{20}$NO$_2$ According to a further feature of the invention there is provided a process for the manufacture of cytochalasin E which comprises cultivation of an active strain of the organism *Rosellinia necatrix* in an aqueous nutrient medium containing a source of assimilable carbon and a source of assimilable nitrogen followed by isolation of the desired product from the culture filtrate.

A suitable strain of organism which may be used in the above process is, for example, *Rosellinia necatrix* originating from the Commonwealth Mycological Institute located at Kew, England where it is identified as CMI 108,006.

A suitable source of assimilable carbon is, for example, a polyhydric alcohol, for example sucrose, glucose or glycerol; a source of polymerised carbohydrate, for example starch; a naturally-occurring or synthetic oil or fat; or mixtures of two or more of the abovementioned substances. The carbon source is generally present in the medium within the range of 0.1 to 30% by weight and preferably within the range of 2 to 8% by weight.

A suitable source of assimilable nitrogen is an inorganic source or an organic source. It may conveniently be provided in the form of, for example, a nitrate of an alkali metal or an alkaline earth metal, or an ammonium salt of an inorganic acid or an organic acid, for example sodium, potassium, calcium or ammonium nitrate or ammonium tartrate, ammonium sulphate or ammonium phosphate. It may also be provided in the form of an amino-acid, for example glycine, a seed meal, for example cottonseed meal, or corn steep liquor, peptone, urea, a yeast extract or a meat extract. Mixtures of two or more of the abovementioned substances may be used. The nitrogen source is generally present in the medium in an amount such that there is present between 0.001% and 1.0%, and preferably between 0.01% and 0.5%, of elementary nitrogen in the medium.

The medium usually contains smaller quantities of essential elements such as phosphorus (for example as potassium dihydrogen phosphate or di-ammonium hydrogen phosphate), magnesium (for example as magnesium sulphate or magnesium carbonate), sulphur (for example as a sulphate) and potassium (for example as potassium chloride or potassium carbonate) and minute quantities of so-called trace elements such as iron, manganese, zinc, molybdenum or copper.

As suitable aqueous nutrient media there may be mentioned, for example, the media known as Raulin-Thom and Czapek-Dox media, and of these the former is preferred.

The cultivation of the organism may be carried out within the temperature range of 15° to 35°C., preferably at a temperature of about 25°C., and growth of the organism is generally complete after 21 to 22 days.

The desired cytochalasin E is present in the culture filtrate and may be isolated by filtration of the culture medium followed by extraction of the culture filtrate with a water-immiscible organic solvent such as chloroform or ethyl acetate, thereby providing a solution of mixed products. The extract may be separated by conventional means into acidic and neutral fractions, and the cytochalasin E is concentrated in the neutral fraction. Further separation and purification may be carried out by means of chromatography using, for example, an absorption column of silica gel and elution solvents which are chloroform, benzene, ethyl acetate or mixtures thereof.

As stated above, cytochalasin E produces effects on tissue culture cells similar to those produced by cytochalasins A, B, C and D, which effects are characterised by the inhibition of cytoplasmic cleavage in vitro, thereby permitting the development of multinucleate cells, and by the inhibition of motility of fibroblasts in vitro, both these effects being observed at a concentration of 0.5 $\mu$g. /ml.; and at higher concentrations by the extrusion of nuclei from fibroblasts. In addition, cytochalasin E produces further effects not produced by cytochalasins A, B, C and D, which are characterised by the production of prominently scalloped margins to cells; and when cells are stained by conventional methods by the production of a characteristic unstained "halo" round the cell nucleus. Cytochalasin E is therefore useful in the study of cytological processes, in particular the study of the anatomy of the nuclear membrane and of the effect of the environment of a cell on its shape.

Furthermore, cytochalasin E has effects on blood platelets, characterised by inhibition of clot retraction and by prevention or slowing down of the aggregation of platelets induced by physiological agents such as adenosine diphosphate, thrombin or collagen fibres. Cytochalasin E is therefore also useful in the study of platelet function.

The invention is illustrated but not limited by the following Example:-

EXAMPLE

An aqueous nutrient medium is made up containing the following ingredients:-

| | |
|---|---|
| Tartaric acid | 0.266% w/v |

-Continued

| | |
|---|---|
| Mono-ammonium tartrate | 0.266% w/v |
| Di-ammonium hydrogen phosphate | 0.04% w/v |
| Potassium carbonate | 0.04% w/v |
| Magnesium carbonate [$3MgCO_3,Mg(OH)_2,3H_2O$] | 0.027% w/v |
| Ammonium sulphate | 0.016% w/v |
| Zinc sulphate heptahydrate | 0.0042% w/v |
| Ferrous sulphate heptahydrate | 0.0042% w/v |
| Dextrose ("Cerelose" brand; "Cerelose" is a Registered Trade Mark) | 5.0% w/v |
| Yeast extract ("Difco" brand; "Difco" is a Registered Trade Mark) | 0.1% w/v |

This medium is placed in glass fermentation vessels (each one containing 1 litre of medium) and the medium is sterilised by autoclaving, the pH of the medium then being 5.6. Each flask is inoculated with 2 ml. of an inoculum of *Rosellinia necatrix* CMI 108,006 previously grown in a bottle slant on agar for 14 days.

The fermentation is carried out at a temperature of 25°C. for 22 days. The medium is then filtered and the culture filtrate (72 litres), which has a pH of 7.4, is adjusted to pH 2.0 with aqueous hydrochloric acid and extracted successively with 15 litres, 7 litres and 7 litres of ethyl acetate. The extracts are combined, dried and evaporated to dryness and there is thus obtained a crude mixture of fermentation products (14.2 g.). The crude mixture is redissolved in ethyl acetate and the solution is washed firstly with aqueous sodium hydrogen carbonate solution to remove carboxylic material and secondly with sodium carbonate solution to remove phenolic material, and is then dried and evaporated to dryness. There is thus obtained a crude mixture of neutral fermentation products (12.8 g.).

The crude mixture is separated as follows:-

A solution of 5 g. of the crude mixture in the minimum volume of benzene is applied to a chromatography column of silica gel (50 ml.) made up in benzene, and the column is eluted successively with a 50% v/v solution of petroleum ether (b.p. 60°-80°C.) in benzene (1,500 ml.), benzene (2,500 ml.), chloroform (1,250 ml.) and chloroform (3,750 ml.). The second chloroform eluate is evaporated to dryness and the semi-solid residue (2.19 g.) is crystallised twice from a mixture of acetone and petroleum ether (b.p. 60°-80°C.). There is thus obtained cytochalasin E (0.87 g.), m.p. 206–209°C. The cytochalasin E may also be crystallised from ethanol.

What we claim is:

1. The compound cytochalasin E, said compound having the following characteristics:

melting point: variable between 200° and 200°C., but commonly 206°–209°C.

infra-red spectrum: bands having $\nu$ max (in liquid paraffin) at 3520, 3450, 3200, 3120 (all weak), 1760, 1730, 1705 (all strong), 1670, 1640, (both weak) cm.$^{-1}$ ultraviolet spectrum: no selective absorption between 225 m$\mu$ and 350 m$\mu$.

proton magnetic resonance spectrum: peaks in the region of $\tau = 2.8$ (aromatic protons) when measured in $CDCl_3$ or $C_5D_5N$;

peaks (doublets) centred (when measured in $C_5D_5N$) at $\tau = 3.16$ and $\tau$ 4.10 respectively, both having a coupling constant of 12.0 cycles per second.

mass spectrometry: heaviest ion observed:- m/e = 495, corresponding to $C_{28}H_{33}NO_7$ other ions:- m/e = 337, corresponding to $C_{22}H_{27}NO_2$ m/e = 246, corresponding to $C_{15}H_{20}NO_2$.

2. A process for the manufacture of cytochalasin E as define in claim 1 which comprises cultivation of the strain of the organism *Rosellinia necatrix* CMI 108,006 in an aqueous nutrient medium a temperature of 15°–35°C. and for a period of up to 21 to 22 days, separation of the extract into acidic and neutral fractions and isolation of the cytochalasin E from the neutral fraction.

* * * * *

UNITED STATES PATENT OFFICE
CERTIFICATE OF CORRECTION

Patent No. 3,890,435            Dated June 17, 1975

Inventor(s) Douglas Broadbent et al

It is certified that error appears in the above-identified patent and that said Letters Patent are hereby corrected as shown below:

In the heading of the patent add:

--[30]    Foreign Application Priority Data

April 29, 1970     Great Britain.....20658/70--

Signed and Sealed this sixteenth Day of September 1975

[SEAL]

Attest:

RUTH C. MASON
*Attesting Officer*

C. MARSHALL DANN
*Commissioner of Patents and Trademarks*